Feb. 9, 1932.　　　P. W. FUNCK　　　1,844,152
MACHINE FOR FORMING HANKS FROM THREADS OF FOOD PASTE
Filed Oct. 11, 1926　　5 Sheets-Sheet 1

Fig.1.

Inventor:
Paul Wilhelm Funck
by
Atty.

Feb. 9, 1932.  P. W. FUNCK  1,844,152
MACHINE FOR FORMING HANKS FROM THREADS OF FOOD PASTE
Filed Oct. 11, 1926   5 Sheets-Sheet 3

Inventor:
Paul Wilhelm Funck
by
Atty.

Patented Feb. 9, 1932

1,844,152

UNITED STATES PATENT OFFICE

PAUL WILHELM FUNCK, OF STUTTGART, GERMANY

MACHINE FOR FORMING HANKS FROM THREADS OF FOOD PASTE

Application filed October 11, 1926, Serial No. 140,995, and in Germany October 16, 1925.

My invention relates to machines for forming hanks from threads of plastic materials, especially of food paste such as vermicelli, noodles and the like. In my Patent 1,044,449 I have described a machine in which the hanks are formed by means of several folding members, whereby the finished hanks are distorted laterally by additional reciprocating means. It is an object of my invention to improve and modify a machine of this kind so as to enable it to form hanks by means of one single folding member which also serves for distorting the hanks while they are being formed.

To this end I provide a folder in the shape of a smooth bar which extends and is reciprocated transversely to the direction of the threads and, if it is desired to distort the hanks, is also displaced in parallel direction during its reciprocation. In this manner straight or distorted hanks of various configuration may be obtained without any liability of damage to the threads as they are only engaged by a bar, preferably a cylindrical rod.

It is another object of my invention to provide means for delivering the finished hanks to a receiver or to a hurdle without the hanks undergoing deformation or damage. The means for delivering the finished hanks preferably include a reciprocating table from which the hanks are dropped.

It is still another object of my invention to provide means for the continuous feeding of hurdles to be charged with the hanks.

In the drawings affixed to this specification and forming part thereof a machine embodying my invention is illustrated diagrammatically by way of example. In the illustrations important parts of the machine have been omitted in some figures which are shown in others, as it would have been impracticable to show in a single figure all the details of the complicated mechanism.

Figure 1:
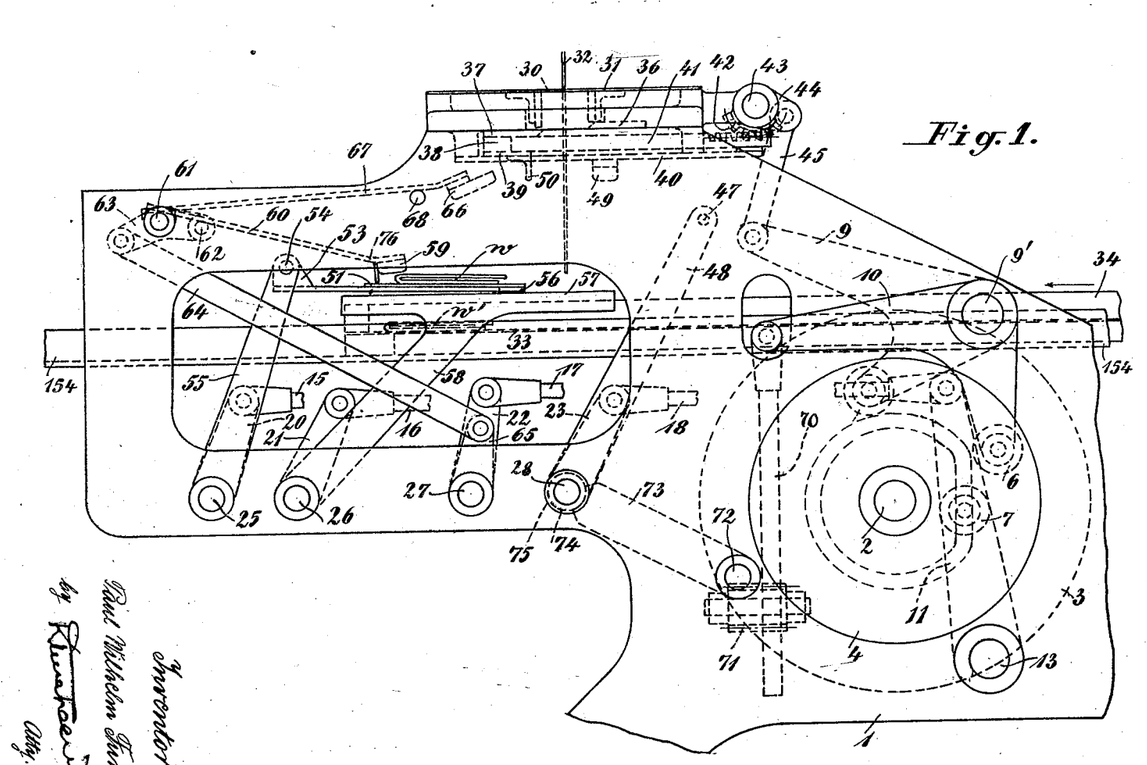
Fig. 1 is an elevation of the rear end of the machine.
Figure 14:
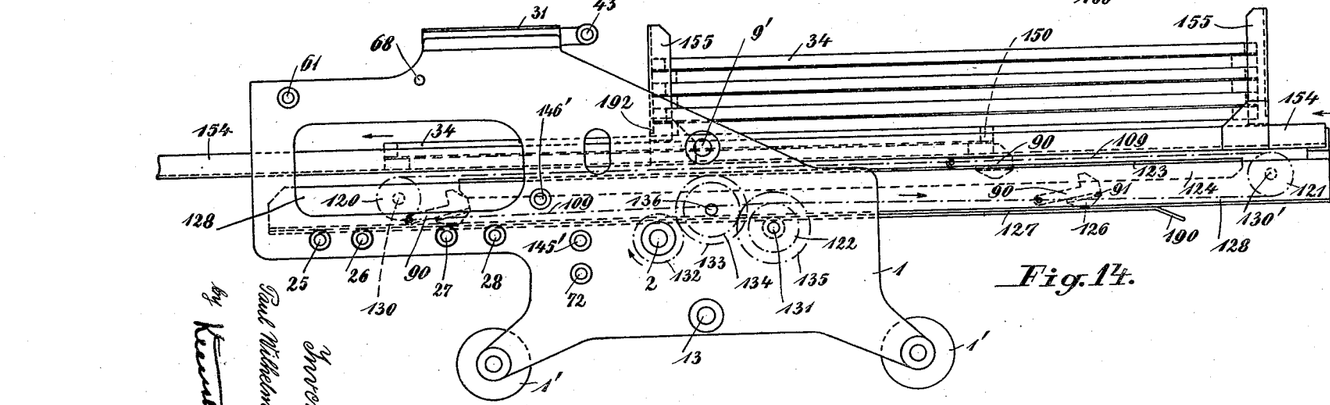
Fig. 14 is an elevation showing the complete machine on a smaller scale.
Figure 15:
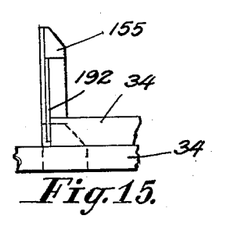
Figs. 15, 16 and 17 illustrate various details of the machine.

Referring first to Fig. 14, 1 is the frame of the machine which comprises two side plates connected by suitable bracings and stays, not shown, and supported on wheels 1' in the case of a portable machine. 2 is the driving shaft of the machine which rotates in the direction of the arrow, that is, clockwise. This shaft operates the mechanism for folding and, if desired, also for distorting the hanks, and further the mechanism for feeding the hurdles 34 through the machine. The forming and distorting mechanism shown in detail in Fig. 1 comprises the rocking levers 9, 10 and a set of four similar rocking levers 11, which all are actuated from the shaft 2 and a set of four rocking levers 20, 21, 22 and 23 on shafts 25, 26, 27 and 28 which in turn are actuated by the set of the levers 11 and operate the folding mechanism.

The hurdles are fed in the direction of the arrows in Figs. 1, 11 and 14 through the medium of a chain 109 with grippers 90 linked thereto and adapted to move the hurdles forward below the charging station where the hanks are successively deposited on the hurdles as indicated at $w'$ in Figs. 1 and 11. The chain 109 is supported on sprockets 120 and 121 at the front and rear ends of a support 128 extending in the longitudinal direction of the machine and projecting at its front end. Motion is imparted to the chain by means of a sprocket 122 on a shaft 131 and the gearing by which the shaft 131 is connected with the driving shaft 2 comprises means for accelerating the motion of the chain when the last hank has been deposited at the end of a hurdle and it is necessary to place the front end of the following hurdle in proper position below the feeding station notwithstanding the fact that the points at the rear end of one hurdle and at the front end of the following hurdle where two successive hanks are deposited are further apart than the corresponding points on each hurdle.

The hurdles are supported on, and moved along, a pair of angle irons 154 in the frame 1 and, if desired, may be superimposed in a frame 155 as shown in Fig. 14 from which the hurdle at the base of the pile is successively removed by the grippers 90. Checks 192 are secured to the front uprights of the frame 155 which are shown as angle sections. The checks 192 are also angle sections and secured to the insides of the uprights. Each check has a projecting end or tongue which serves for restraining the hurdles above the hurdle which is being fed. Empty hurdles are placed on top of the pile. Obviously, other means may be provided for supplying the hurdles and they may also be placed in the machine by hand.

Referring now to Fig. 1, which illustrates the charging station and the mechanism arranged at this station the threads of food paste, vermicelli, noodles or the like 32 are delivered vertically from an extruder (not shown) through an opening 30 in a cover plate 31 and are divided by a stationary blade 36 and a blade 37 in a reciprocating frame 38 below the stationary blade 36. The threads are engaged by the folder 47 which reciprocates about the shaft 28 and folded into hanks $w$ of four or six reaches, or any other number, as desired, and the finished hanks are successively deposited on the hurdles 34 at $w'$. The hurdles are fed through the machine at uniform velocity except after the last hank has been deposited on a hurdle and it is necessary to bring the following hurdle forward more rapidly, as mentioned above, and therefore the hurdles will advance through the same distance below the charging station while the hanks are being formed, and the hanks will therefore be deposited on the hurdles at uniform distances.

The mechanism for folding and, if desired, distorting the hanks will now be described with reference to Fig. 1. 3 is a pulley at the rear end of the machine by which rotation is imparted to the driving shaft 2. Obviously, any other suitable means may be provided for rotating the shaft. Six grooved cam plates 4 are keyed on the shaft 2. The cam plates are of equal diameter and therefore only one of them appears in Fig. 1, the camway of one of them being shown in dotted lines. The camways in the other cam plates are not shown as this would have confused the drawings. Each cam plate cooperates with a roller at the end of a rocking lever which engages in the groove of the corresponding cam plate. Two of the rocking levers 9 and 10 with their rollers 5 and 6 are carried at both sides of the machine on pins 9' in the frame 1 and four levers 11 with rollers 7 are carried on a separate shaft 13. The upper ends of these levers are connected with the levers 20, 21, 22, 23 on the shafts 25, 26, 27, 28 through the medium of links 15, 16, 17 and 18 so that the levers are operated in unison by the levers 11.

The rocking lever 9 is connected with a shaft 43 in the vicinity of the plate 31 by means of a link 45 and a lever 44 on the shaft 43. 42 are toothed sectors on the shaft 43 which are meshing with racks 41 sliding on a pair of forwardly extending bars 40 and connected with the frame 38 which supports the blade 37. A check 49 is secured at the bars 40 and a check 50 at the lower face of the frame 38, both checks being on either side of the threads 32, with the object of assisting in the folding operation as will be described below.

48 are two arms secured on the shaft 28 and 47 is a folder constituted by a transverse bar at the ends of the arms 48. When the hanks have been folded by the folder 47 in cooperation with the checks 49 and 50, as will be described, they are deposited on a movable table 51 which is suspended at one end from pins 54 by brackets 53, the pins being secured at the ends of a pair of arms 55 on the shaft 25. The free end of the table is provided with a transverse bar 56 which slides on the top of straight-edges 57 at the upper ends of levers 58 on the shaft 26. In the position shown in Fig. 1, the straight-edges 57 are horizontal. The ends of the threads are held on the table 51 by means of a holder 59 at the free end of a pair of levers 60 which holder 59 is equipped with a transverse retaining strip 76. These levers are free to turn on a shaft 61 and to be raised by means of a pin 62 at the end of a double-armed lever 63 which is rocked about the shaft through the medium of a link 64. This link is connected to an arm 65 on the shaft 27. 66 is a weight at the end of levers 67 which are also free to turn about the shaft 61 and normally rest on a transverse bar 68.

Figure 2:
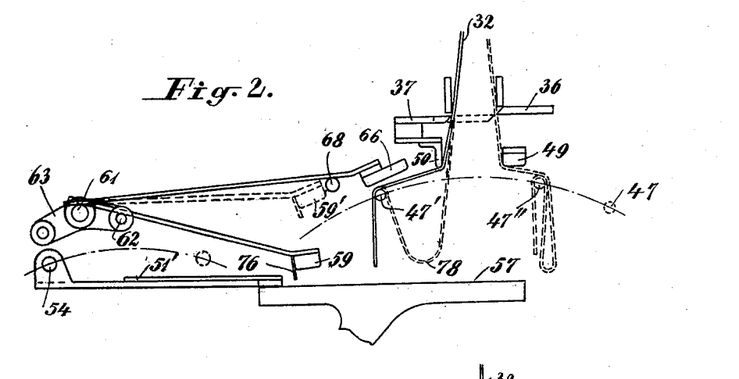
Figs. 2, 3 and 4 are diagrammatic illustrations showing the several stages of folding a hank with four reaches.
Figure 3:
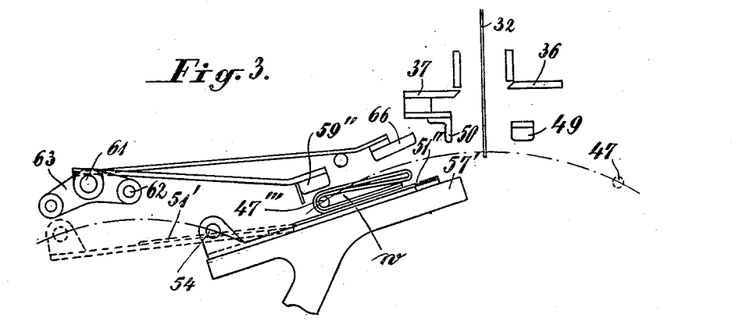
Figure 4:
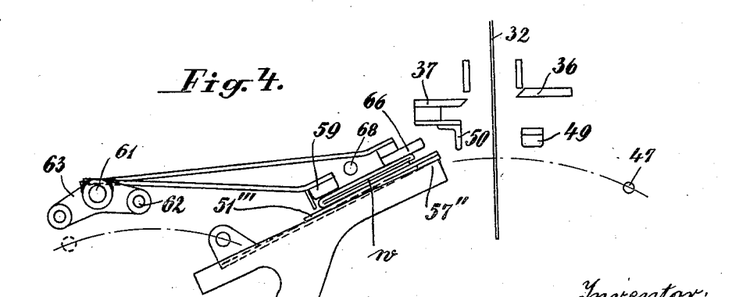
Figure 17:
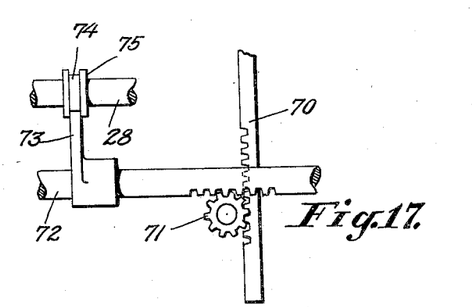

The shaft 28 on which the folding bar 47 is held by the arms 48, is adapted to be displaced transversely through the medium of the rocking lever 10 to which a rack 70 is hinged, as shown in Fig. 17 in end elevation viewed from the left in Fig. 1. The rack is meshing with a pinion 71 which in turn meshes with a circular rack 72, and this rack is provided with an arm 73 engaging a circular groove 74 in a sleeve 75 on the shaft 28. The stages of forming the hanks are illustrated in Figs. 2, 3 and 4. The position of the parts illustrated in full lines in Fig. 2 corresponds to that illustrated in Fig. 1, excepting the table 51, that is, the folder 47 is at the right-hand end of its stroke, the straight-edge 57 is horizontal, the holder 59 is lowered and the weight 66 rests on the pin 68. The table 51 has been moved to its final position 51' at the left by the shaft 25 and the levers connected thereto, as described. The folder 47 now moves to the left into the position 47' stretching the threads 32 across the check 50 as shown in full lines in Fig. 2. The groove in the cam plate 4 which operates the rocking lever 11 is so shaped that the folder is held in the position 47' for a certain period so that as the threads are continuously extruded, they will form a chain line 78. The folder now moves to the right into the position 47'' in which the threads are stretched across the bar 49 as shown in dotted lines in Fig. 2, and the threads are separated by the blade 37 which is moved to the right with regard to the blade 36 by means of the rocking lever 9, the shaft 43 and the sectors 42. The separated end of the thread drops down and the hank suspended on the folder 47 comprises four vertical reaches. The holder 59 is now raised into the position 59' in Fig. 2 by the pin 62. At the same time the folder 47 is moved to the left into the position 47''' carrying the hank $w$ along with it, the straight-edge 57 is inclined upwards into the position 57' and the table 51 is moved to the right into the position 51'' so that the hank is received by the table in the inclined position shown in Fig. 3. The holder 59 is allowed to return into its initial position in which it retains the hank $w$ on the table 51 and compresses its left-hand end while the folder 47 returns to the right into the position 47. The straight-edge is raised further into the position 57'' while at the same time the table 51 is advanced still further into the position 51''', causing the opposite bend of the hank $w$ to engage below the weight 66 which is raised thereby and compresses the hank at its right-hand end. The straight-edge 57 is now returned into the horizontal position shown in Fig. 1 while the table 51 returns rapidly into the position 51' Fig. 2, so that the hank which is retained by the strip 76 of the holder 59, is deposited on the bottom 33 of the hurdle 34 as shown at $w'$ in Fig. 1.

Figure 5:
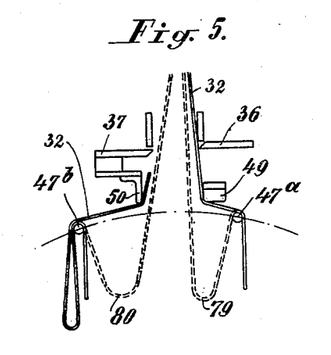
Figs. 5 and 6 are similar figures showing the folding of a hank with six reaches.
Figure 6:
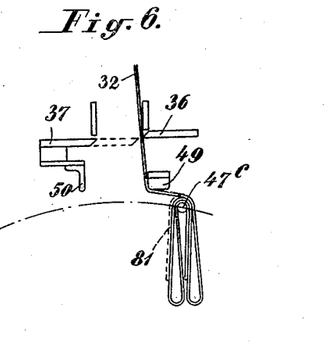

Figs. 5 and 6 illustrate the formation of a hank comprising six vertical reaches. The folder 47 is moved from the position 47''', Fig. 3, to the right into the position $47^a$, Fig. 5, stretching the threads 32 across the check 49 as shown in full lines in Fig. 5. The folder remains in the position $47^a$ for a short time so that a chain line 79 forms as indicated in dotted lines in Fig. 5, and is then moved to the left into the position $47^b$ in which the threads are stretched on the check 50 as shown in full lines, forming a loop on the folder. The folder remains in the position $47^b$ for a short period so that the second chain line 80 will form, and is then moved again to the right into the position $47^c$, Fig. 6, in which the threads are suspended as shown, forming five vertical reaches. The threads are now cut by the blades 36 and 37 and the separated ends 81 drop down as shown in dotted lines, forming the sixth vertical reach. The further treatment of the hanks formed in this manner is the same as illustrated in Figs. 3 and 4.

Figure 7:
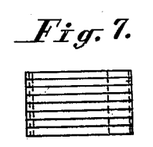
Figs. 7, 8, 9 and 10 are plan views of various forms of hanks which may be formed in my machine.
Figure 8:
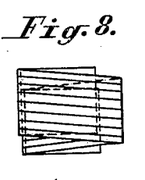
Figure 9:
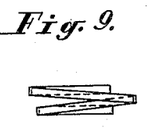
Figure 10:
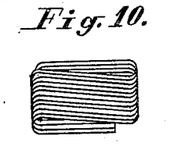

The folder may be displaced transversely by the rocking lever 10 and the parts connected thereto, but such transverse displacement may also be dispensed with. In the latter case the threads of the hank will be parallel as shown in Fig. 7. When the holder is displaced when moving from the position 47', Fig. 2, into the position 47''', the threads of the hank will be inclined at an angle and, when crushed, will separate into pieces as shown in Fig. 9. This form of hank is particularly suitable for comparatively wide threads. The hank illustrated in Fig. 10 is more suitable for thin threads and is formed when the folder is displaced passing from the position 47' into the position 47'', Fig. 2, and further displaced in the same direction at the beginning when passing from the position 47''', Fig. 3, into the position 47, and then is reversed until the end of the thread has been separated and allowed to drop.

Figure 11:
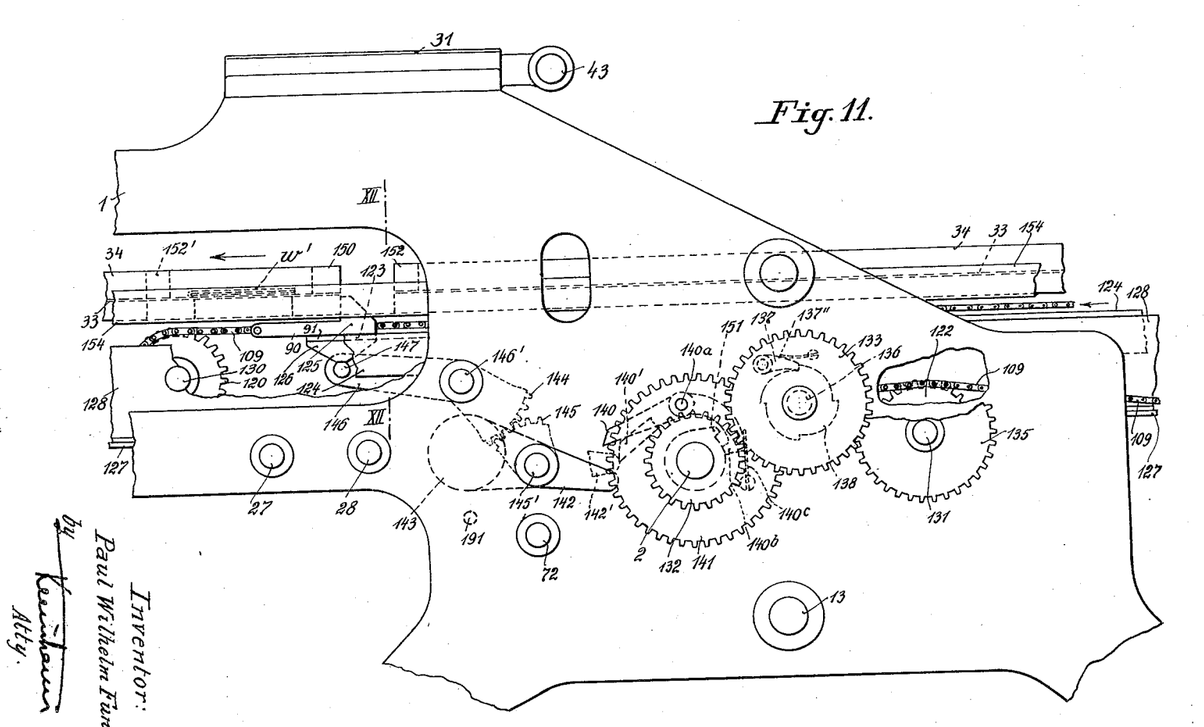
Fig. 11 is an elevation similar to Fig. 1 but extended further toward the front end of the machine.
Figure 12:
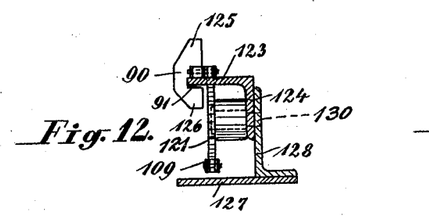
Fig. 12 is a section on the line XII—XII of Fig. 11.

Fig. 11 shows one of the hurdles 34 with its rear end below the feeding station, and the last hank has just been deposited at $w'$ in front of the rear bar 150 of this hurdle. The front bar 152 of the following hurdle is at some distance from the rear bar to make room for the hook 125 of the gripper 90. Three grippers are provided in equidistant relation along the chain 109. The chain extends in parallel to the hurdles below their longitudinal axis as shown in Fig. 12 and its loose sprockets 120, 121 are loosely carried on pins 130, 130' which are secured at the ends of the support 128 which, as appears from Fig. 12 consists of an angle iron and a plate 127 which is secured to the lower flange of the angle iron 128. The angle iron 128 and the angle iron 124 are shown partly broken away in Fig. 11 which figure shows one of the grippers 90 with its slot 91 being engaged by the horizontal flange 123 of the angle iron 124.

Figure 13:
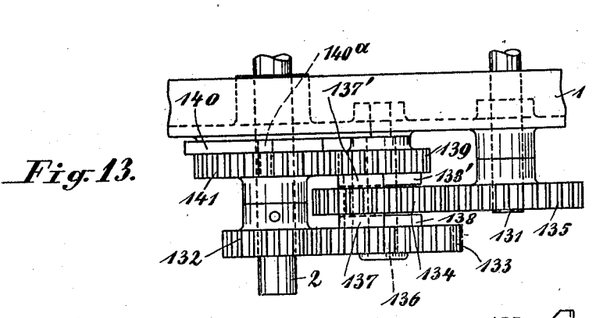
Fig. 13 is a detail plan view of the gearing for feeding hurdles through the machine.

The gearing by which rotation is imparted to the shaft 131 of the sprocket 122 is shown in Fig. 13. It comprises a pinion 132 on the shaft 2, intermediate gears 133 and 134 on a pin 136, and a gear 135 on the shaft 131. This gearing also comprises the mechanism for accelerating the motion of the chain 109 at the end of one hurdle and the beginning of the next. This mechanism will be described below.

124 is an angular iron which is secured to the vertical flange of the iron 128 with its vertical flange. Its horizontal flange 123 extends below the upper stretch of the chain 109 and the flange 127 extends below the lower stretch of the chain.

Each gripper 90 is provided with a cam 126 extending downwardly from its rear end and this cam is slotted at 91 for the reception of the flange 123 so that the grippers while moving along the angular iron 124 are supported in the position illustrated in Fig. 11 but are allowed to drop onto the plate 127 as soon as they have moved past the front end of the flange 123. The upper end 125 of each gripper is hook-shaped and adapted to engage behind the rear bars 150 of the hurdles 34 so as to move each hurdle along with the chain 109 in the direction of the arrows at the upper stretch of the chain in Figs. 11 and 14. The lower stretch of the chain moves in opposite direction, that is from the left to the right, and the cams 126 of the grippers 90 slide on the plate 127 until they are finally released by its inclined end 190, Fig. 14, and allowed to return about the sprocket 121 so that their notches 91 will again engage the front end of the flange 123.

Means are provided in connection with the driving sprocket 122 of the chain 109 for moving the hurdles more rapidly past the charging station where the hanks are deposited on the hurdles at $w'$. The acceleration of the feeding motion is started immediately after a preceding hurdle has received the last hank at $w'$, that is, when its rear bar 150 is in the position indicated in Fig. 11. From this position it is removed rapidly and the front bar 152 of the following hurdle is advanced as rapidly into the position 152' indicated in dotted lines in which it is ready to receive the first hank.

The acceleration is effected by a gearing which is illustrated in Figs. 11 and 13 and is inoperative during the normal feeding motion of the hurdles, that is, during their motion for receiving all hanks except the last one. During the normal feeding motion of the hurdles the gearing 132, 133, 134 and 135 operates as described but when the rear bar 150 of a hurdle is in the position illustrated in Fig. 11 the cam 126 of the gripper 90 which is cooperating with the rear bar engages and depresses a pin 147 at the end of a lever 146 which is carried on a shaft 146' in the frame 1. A toothed sector 144 is secured on the shaft 146' and meshing with a toothed sector 145 on a shaft 145' which is also carried in the frame 1. Keyed on this shaft is a lever 142 which is weighted at 143 the downward stroke of which is limited by a pin 191.

The free end of the lever 142 controls a pawl 140 which is fulcrumed at $140^a$ on a gear 141 loosely seated on the shaft 2. The rear end $140^b$ of the pawl 140 cooperates with a single-tooth pinion 151 which is keyed on the shaft 2 behind the rear of the gear 141. A spring $140^c$ on the gear 141 tends to hold the end $140^b$ of the pawl 140 engaged with the concentric portion of the pinion 151.

Figure 16:
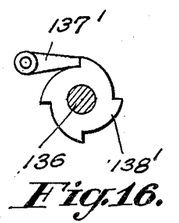

The gear 141 is meshing with a pinion 139 on the pin 136. 138' is a ratchet wheel secured to the front face of the pinion 139, and 137' is a pawl supported on the rear face of the pinion 134 which is also seated on the pin 136. 138 is a similar ratchet wheel secured to the rear face of the gear 133, and 137 is its pawl which is supported on the front face of the gear 134. The ratchets and their pawls are shown in Figs. 11, 13 and 16. Both pawls 137 and 137' are supported on either side of the pinion 134 and the corresponding ratchet wheels 138 and 138' are secured on the rear face of the gear 133 and on the front face of the pinion 139, respectively.

This gear is held stationary during the normal feeding motion of the hurdles as the lever 142 is normally raised at its free end by the weight 143, forcing the pawl 140 toward the shaft 2 as indicated at 140' and 142' so that the opposite end $140^b$ of the pawl is moved out of the shaft of the tooth 151 and the wheel 141 does not partake in the rotation of the shaft 2. When, however, the lever 146 is depressed by the cam 126 of one of the grippers 90 the lever 142 will be moved into its under position shown in full lines, releasing the pawl 140 and allowing its spring $140^c$ to place the end $140^b$ within reach of the tooth 151. This causes the gear 141 to become positively engaged with the shaft 2 and the shaft 131 to be rotated at a more rapid rate due to the higher ratio of the gearing 141, 139. The pinion 132 and the gear 133 do not interfere with this more rapid rotation of the shaft 131, because the pawls 137 and 137' allow the pinion 139 to lead the gear 133.

I wish it to be understood that I do not desire to be limited to the exact details of construction shown and described for obvious modifications will occur to a person skilled in the art.

I claim:—

1. In a machine for folding plastic threads such as vermicelli, noodles and the like, means for continuously feeding the threads vertically, a folder for taking up the threads and means for moving said folder transversely with respect to said threads with one of its edges leading and for reversing said folder after said threads have formed a loop on its trailing edge.

2. In a machine for folding plastic threads such as vermicelli, noodles and the like, means for continuously feeding the threads vertically, a folder for taking up the threads, means for moving said folder transversely with respect to said threads with one of its edges leading, and for reversing said folder after said threads have formed a loop on its trailing edge, and a check adapted to retain said threads so as to facilitate the formation of a loop after said folder has performed its forward stroke.

3. In a machine for folding plastic threads such as vermicelli, noodles and the like, means for continuously feeding the threads vertically, a folding bar for taking up the threads so that they hang in depending loops from the bar, and means for repeatedly reciprocating said folder transversely with respect to said threads.

4. In a machine for folding plastic threads such as vermicelli, noodles and the like, means for continuously feeding the threads vertically, a folding bar extending transversely to the threads, a shaft on which said bar is supported at some distance from the axis of said shaft, and means for rocking said shaft so that said bar will repeatedly fold said threads.

5. In a machine for folding into hanks plastic threads such as vermicelli, noodles and the like, means for folding the threads into hanks, a table for receiving the finished hanks, means for reciprocating said table, and means for stripping the finished hanks from said table.

6. In a machine for folding into hanks plastic threads such as vermicelli, noodles and the like, a folder, means for reciprocating said folder, a table for receiving the finished hanks, means for reciprocating and tilting said table, and means for delivering the finished hanks to a receiver.

7. In a machine for folding into hanks plastic threads such as vermicelli, noodles and the like, a folder, means for reciprocating said folder, a table for receiving the finished hanks, means for reciprocating said table, means for stripping the finished hanks from said table during its reciprocation, and means for receiving the hanks stripped from said table.

8. In a machine for folding into hanks plastic threads, such as vermicelli, noodles and the like, a folder, means for reciprocating said folder, a table for receiving the finished hanks, means for reciprocating said table, means for depositing the finished hanks on said table, means for exerting pressure on said hanks, and means on said pressure-exerting means for stripping said hanks on said table.

9. In a machine for folding into hanks plastic threads such as vermicelli, noodles and the like, a folder, means for reciprocating said folder, a table for receiving the finished hanks, means for reciprocating said table, means for raising it into a receiving, and for lowering it into a delivering position, and means for delivering the finished hanks to a receiver.

10. In a machine for folding into hanks plastic threads such as vermicelli, noodles and the like, a folder, means for reciprocating said folder, a guide, a table for receiving the finished hanks which is supported on said guide at one end, means for raising and lowering said guide, means for reciprocating said table, and means for delivering the finished hanks to a receiver.

11. In a machine for folding into hanks plastic threads such as vermicelli, noodles and the like, means for continuously feeding the threads vertically, a folding bar extending transversely to the threads, a shaft on which said bar is supported at some distance from the axis of said shaft, a cutter for dividing the threads, means for reciprocating said cutter, a check on said cutter, adapted to partake in its reciprocation, and means for depositing the finished hanks on hurdles.

12. In a machine for folding into hanks plastic threads such as vermicelli, noodles and the like, means for continuously feeding the threads vertically, a folder, means for reciprocating said folder transversely to the threads, a cutter for dividing the threads, a table for receiving the finished hanks, means for reciprocating said table, means operatively connected to said table for exerting pressure on the ends of the hanks, and means for depositing the finished hanks on hurdles.

13. In a machine for folding into hanks plastic threads such as vermicelli, noodles and the like, means for continuously feeding the threads vertically, a folder, means for reciprocating said folder transversely to the threads, a cutter for dividing the threads, a table for receiving the finished hanks, means for reciprocating said table, means operatively connected to said table for exerting pressure on the ends of the hanks, and means supported by said pressure-exerting means for stripping the hanks from said table.

14. In a machine for folding into hanks plastic threads such as vermicelli, noodles and the like, means for continuously feeding the threads vertically, a folder, means for reciprocating said folder transversely to the threads, a cutter for dividing the threads, a table for receiving the finished hanks, means for reciprocating and tilting said table, means operatively connected to said table for exerting pressure on the ends of the hanks, and means for depositing the finished hanks on hurdles.

15. In a machine for folding into hanks plastic threads such as vermicelli, noodles and the like, means for folding the threads into hanks, a hurdle, means for depositing the finished hanks on said hurdle, a chain, means for moving said chain through the machine, a hurdle guide arranged near one of the reaches of said chain, a gripper on said chain adapted to engage said hurdle, means for holding said gripper engaged with said hurdle until said hurdle has moved past a charging station, means for periodically accelerating the rate at which said chain moves, and means operatively connected to said gripper for throwing in said accelerating means.

16. In a machine for folding plastic threads into hanks such as vermicelli, noodles and the like, means for folding the threads into hanks, a hurdle, means for depositing the finished hanks on said hurdle, a chain, means for moving said chain through said machine, a hurdle guide arranged near one of the reaches of said chain, a gripper on said chain adapted to engage said hurdle, means for holding said gripper engaged with said hurdle until said hurdle has moved past a charging station, means for periodically accelerating the rate at which said chain is moving, and means operatively connected with said chain for throwing in said accelerating means.

17. In a machine for folding plastic threads into hanks such as vermicelli, noodles and the like, means for folding the threads into hanks, a hurdle, means for depositing the finished hanks on said hurdle, a chain, means for moving said chain through said machine, a hurdle guide arranged near one of the reaches of said chain, a gripper on said chain adapted to engage said hurdle, means for holding said gripper engaged with said hurdle until said hurdle has moved past a charging station, means for periodically accelerating the rate at which said chain is moving, and means operatively connected with said chain-moving means for throwing in said accelerating means.

In testimony whereof I affix my signature.

PAUL WILHELM FUNCK.